(12) United States Patent
Kroeze et al.

(10) Patent No.: US 11,358,637 B2
(45) Date of Patent: Jun. 14, 2022

(54) METHOD AND APPARATUS FOR DETERMINING A TRAILER HITCH ARTICULATION ANGLE IN A MOTOR VEHICLE

(71) Applicant: GM GLOBAL TECHNOLOGY OPERATIONS LLC, Detroit, MI (US)

(72) Inventors: Zachary T. Kroeze, Toronto (CA); Yun Qian Miao, Waterloo (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 251 days.

(21) Appl. No.: 16/715,350

(22) Filed: Dec. 16, 2019

(65) Prior Publication Data
US 2021/0179172 A1    Jun. 17, 2021

(51) Int. Cl.
| | | |
|---|---|---|
| B62D 13/06 | (2006.01) | |
| B62D 15/02 | (2006.01) | |
| B60R 1/00 | (2022.01) | |
| G05D 1/02 | (2020.01) | |
| G05D 1/00 | (2006.01) | |
| G01S 17/93 | (2020.01) | |
| G01S 17/89 | (2020.01) | |

(52) U.S. Cl.
CPC .......... *B62D 13/06* (2013.01); *B60R 1/003* (2013.01); *B62D 15/021* (2013.01); *B62D 15/0285* (2013.01); *G05D 1/0088* (2013.01); *G05D 1/0212* (2013.01); *G05D 1/0246* (2013.01); *B60R 2300/301* (2013.01); *B60R 2300/806* (2013.01); *G01S 17/89* (2013.01); *G01S 17/93* (2013.01)

(58) Field of Classification Search
None
See application file for complete search history.

(56) References Cited

U.S. PATENT DOCUMENTS

| | | | | |
|---|---|---|---|---|
| 2016/0009509 | A1* | 1/2016 | Bonefas | G05D 1/021 414/809 |
| 2016/0023525 | A1* | 1/2016 | Lavoie | B60D 1/305 340/431 |
| 2017/0106865 | A1* | 4/2017 | Lavoie | B62D 13/06 |
| 2017/0174128 | A1* | 6/2017 | Hu | G06T 7/74 |
| 2017/0341583 | A1* | 11/2017 | Zhang | H04N 7/181 |
| 2019/0061817 | A1* | 2/2019 | Mattern | B62D 15/0285 |
| 2019/0071088 | A1* | 3/2019 | Hu | G06T 7/60 |

(Continued)

*Primary Examiner* — Peter D Nolan
*Assistant Examiner* — Demetra R Smith-Stewart
(74) *Attorney, Agent, or Firm* — Lorenz & Kopf LLP

(57) ABSTRACT

Methods and apparatus are provided for determining a hitch articulation angle including a camera for capturing a first image and a second image, a steering sensor configured to detect a steering angle, a velocity sensor configured to detect a vehicle velocity, a processor configured to for generating a bird's eye view of the first image and the second image through a perspective transform, generating a trailer hitch model from the first image in response to the steering angle and the vehicle velocity indicating a vehicle is traveling in a straight forward direction, generating a current hitch model from the second image, determining a hitch articulation angle in response to an angular difference between the trailer hitch model and the current hitch model, and a vehicle controller controlling the vehicle in response to the hitch articulation angle.

20 Claims, 6 Drawing Sheets

(56) References Cited

U.S. PATENT DOCUMENTS

2019/0126851 A1\* 5/2019 Greenwood ........... B60K 35/00
2020/0148256 A1\* 5/2020 Brimmer .............. B62D 15/025
2020/0148257 A1\* 5/2020 Niewiadomski ....... B62D 13/06
2021/0149044 A1\* 5/2021 Sim ........................... B60T 7/22

\* cited by examiner

METHOD AND APPARATUS FOR DETERMINING A TRAILER HITCH ARTICULATION ANGLE IN A MOTOR VEHICLE

INTRODUCTION

The present disclosure relates generally to a system of determining a trailer hitch articulation angle using a rear-view camera for use in a trailering application with a motor vehicle. More specifically, aspects of the present disclosure relate to systems, methods and devices for modeling a trailer hitch configuration using a rear-view camera during a forward straight-line operation of the vehicle and trailer and determining an angle between the centerline of a towable vehicle and the centerline of an attached trailer using a rear view camera during a trailering operation.

Pulling a trailer with a tow vehicle has always been and remains a complicated endeavor for many drivers. The ball hitch is typically employed as a trailer connection and provides a joint between the tow vehicle and the trailer. Aiming the trailer involves turning the rear of the tow vehicle in the opposite direction of the desired direction of the trailer. For automated and advanced driver assistance systems (ADAS) equipped vehicles, determining a hitch articulation angle (HAA) is the key component for performing ADAS features such as autonomous vehicle operation with trailering, jack knife detection, and fully automated trailer parking. However, different trailers have different hitch configurations, thereby complicating a trailer centerline detection and HAA by an ADAS. It would be desirable to provide improved trailer centerline detection by an ADAS while overcoming the aforementioned problems.

The above information disclosed in this background section is only for enhancement of understanding of the background of the invention and therefore it may contain information that does not form the prior art that is already known in this country to a person of ordinary skill in the art.

SUMMARY

Disclosed herein are vehicle braking methods and systems and related control logic for provisioning vehicle systems, methods for making and methods for operating such systems, and motor vehicles equipped with onboard control systems. By way of example, and not limitation, there is presented various embodiments of automatic determination of a trailer hitch articulation angle for trailering in a motor vehicle, and a method for performing automatic determination of a trailer hitch articulation angle for trailering in a motor vehicle are disclosed herein.

In accordance with an aspect of the present invention, an apparatus having a camera for capturing a first image and a second image, a steering sensor configured to detect a steering angle, a velocity sensor configured to detect a vehicle velocity, a processor configured to for generating a trailer hitch model from the first image in response to the steering angle and the vehicle velocity indicating a vehicle is traveling in a straight forward direction, generating a current hitch model from the second image, determining a hitch articulation angle in response to an angular difference between the trailer hitch model and the current hitch model, and a vehicle controller controlling the vehicle in response to the hitch articulation angle.

In accordance with an aspect of the present invention, a trailer interface for generating a trailer connection indicator and wherein the trailer hitch model and the current hitch model are generated in response to the trailer connection indicator being indicative of an attached trailer.

In accordance with an aspect of the present invention, the camera including a rear-view camera.

In accordance with an aspect of the present invention the trailer hitch model being generated in response to an edge detection algorithm and the first image.

In accordance with an aspect of the present invention wherein the trailer hitch model includes a trailer centerline.

In accordance with an aspect of the present invention wherein the trailer hitch model is generated in response to a Canny edge detection algorithm and the first image.

In accordance with an aspect of the present invention a memory for storing the trailer hitch model.

In accordance with an aspect of the present invention wherein the vehicle controller is configured to perform a reverse trailering operation in response to the hitch articulation angle.

In accordance with an aspect of the present invention, a method including capturing a first image of a trailer hitch assembly in response to a vehicle traveling in a straight and forward direction, generating a trailer hitch model in response to an image processing technique performed on the first image, capturing a second image of the trailer hitch assembly in response to the vehicle traveling in a rearward direction, generating a current hitch model in response to the image processing technique performed on the second image, determining a hitch articulation angle in response to an angular difference between the trailer hitch model and the current hitch model, controlling the vehicle in response to the hitch articulation angle.

In accordance with an aspect of the present invention wherein the first image is further captured in response to an indication of a trailer connection.

In accordance with an aspect of the present invention wherein the first image and the second image are generated by a lidar system.

In accordance with an aspect of the present invention wherein controlling the vehicle includes performing an automated driving assistance algorithm during a towing operation.

In accordance with an aspect of the present invention wherein the first image and the second image are captured by a rear-view camera.

In accordance with an aspect of the present invention wherein the image processing technique is an edge detection operation.

In accordance with an aspect of the present invention wherein the method is performed by a vehicle controller in response to an indication of a towing operation.

In accordance with an aspect of the present invention wherein the first image is captured in response to a trailer detection indicator generated by a trailer interface.

In accordance with an aspect of the present invention, an advanced driver assistance system including an inertial measurement unit for detecting a vehicle acceleration, a camera for capturing a first image of a trailer hitch assembly and a second image of the trailer hitch assembly, a processor configured to generate a trailer hitch model in response to the first image and the vehicle acceleration being indicative of a forward vehicle motion, a current hitch model in response to the second image and the vehicle acceleration being indicative of a reverse vehicle motion and to determine a hitch articulation angle in response to a comparison of the current hitch model and the trailer hitch model, and a vehicle controller configured to perform a reversing operation in response to the hitch articulation angle.

In accordance with an aspect of the present invention including a trailer interface configured to detect a trailer indicator in response to a connection of a trailer and wherein the trailer hitch model and current hitch model are generated in response to the trailer indicator.

In accordance with an aspect of the present invention wherein the forward vehicle motion and the reverse vehicle motion are determined in response to a transmission gear selection.

In accordance with an aspect of the present invention wherein the trailer hitch model further includes a perspective transformation to a top down view of the trailer hitch assembly.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

The exemplary algorithm is operative to use images from a typical vehicular rear-view camera in addition to vehicle system positions, such as vehicle speed and steering wheel angle received via controller area network (CAN) messages to model and detect a trailer HAA. The system may be operative to employ a learning routine where during operation of the vehicle in a straight line enables the algorithm to learn an accurate model of the trailer. The learning routine performed during the straight-line operation of the vehicle may be done at the beginning of the vehicle operation with a driver input or automatically during the vehicle operation without driver input. The exemplary system may also be operative to perform a perspective transformation to provide a top down view of the trailer to simplify the determination of the hitch articulation angle thereby allowing generation of sub-degree templates from one driving snapshot.

Advantages of the proposed system include a perspective transformation to enable trailer hitch articulation angle at all angles, using existing hardware on towable vehicles in order to perform the learning and detection operation. Using this exemplary algorithm, the exemplary system may be operative to generate an accurate model of each customer's trailer can be learned regardless of additions to trailer. In addition, the exemplary system may be operative to transform the captured rear view image of the trailer hitch to a bird's eye view in order to simplify geometry of the method and for presentation to a vehicle operator or the like.

Figure 1A:
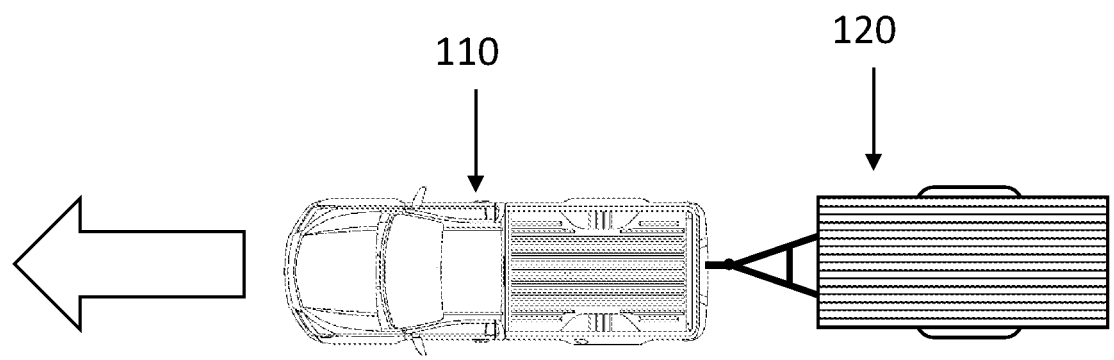
FIG. 1a shows an application for the method and apparatus for determining a trailer hitch articulation angle in a motor vehicle according to an exemplary embodiment of the present disclosure.

Turning now to FIG. 1a, an application for the method and apparatus for generating a trailer hitch articulation angle model in a motor vehicle according to an exemplary embodiment of the present disclosure is shown. The exemplary application shows a towing vehicle 110 and a trailer 120 traveling in a forward direction. During forward travel in a straight direction, it may be assumed that the tow vehicle centerline and the trailer vehicle centerline are aligned. The exemplary system may be operative to determine that the towing vehicle is traveling straight in a forward direction in response to a steering controller angle and a vehicle speed indication received from vehicle sensors or a vehicle controller, via a CAN bus. In response to a determination that the towing vehicle is traveling straight in a forward direction, the system is then operative to capture an image of the current trailer hitch configuration. The system is then operative to generate one or more models of the trailer hitch configuration using edge detection and other image detection techniques. In one exemplary embodiment, the system is operative for averaging of images over a time sequence in straight driving mode to generate the model. The model may include indications of physical characteristics, such as straight edges, determined centerline, etc. In another exemplary embodiment, the exemplary system may be further operative to perform a perspective transform on the model to generate a top down perspective view of the model in order to simplify the geometry of the determination of the hitch articulation angle.

Figure 1B:
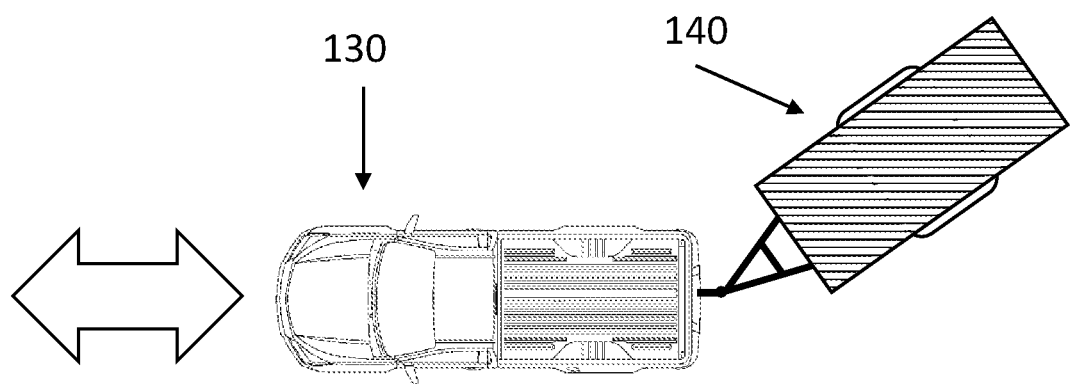
FIG. 1b shows an application for the method and apparatus for determining a trailer hitch articulation angle in a motor vehicle according to an exemplary embodiment of the present disclosure.

Turning now to FIG. 1b, an application for the method and apparatus for determining a trailer hitch articulation angle in a motor vehicle according to an exemplary embodiment of the present disclosure is shown. The exemplary application shows a towing vehicle 130 and a trailer 140 traveling in one of a forward direction or a rearward direction. The exemplary system is then operative to capture a real time image of the trailer hitch configuration. The exemplary system is then operative to compare the previously captured model to the real time image to determine an HAA in response to the differences between the previously captured model and the real time image. For example, the exemplary system may compare one or more detected edges in the real time image and determine an angle between the detected edge in the model and the real time image detected edge. The angle between the two detected edges may then be used to determine an HAA.

Figure 2A:
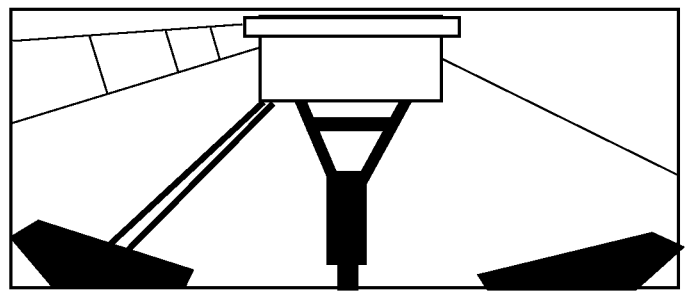
FIG. 2a shows an exemplary image according to an exemplary embodiment of a system for determining a trailer hitch articulation angle in a motor vehicle according to an exemplary embodiment of the present disclosure.

Turning now to FIG. 2a, an exemplary image according to an exemplary embodiment of a system for determining a trailer hitch articulation angle in a motor vehicle is shown. The exemplary image may be captured by a rear view camera mounted in the towing vehicle. The perspective of the hitch assembly in the exemplary image is from the front and slightly above the hitch assembly. The perspective angle of the hitch assembly may be dependent on the height of the camera mounted on the towing vehicle and the height of the trailer hitch assembly. For example, a rear mounted camera is a typical car may be lower that a rear mounted camera is a typical pickup truck. It is desirable to provide a top down view of the hitch assembly for hitch articulation angle estimation.

Figure 2B:
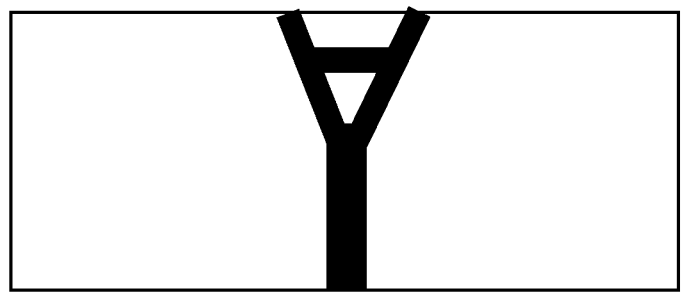
FIG. 2b shows an exemplary for determining a trailer hitch articulation angle in a motor vehicle after applying a homography transformation according to an exemplary embodiment of the present disclosure.

Turning now to FIG. 2b, an exemplary image is shown for determining a trailer hitch articulation angle in a motor vehicle after applying a homography transformation in a motor vehicle according to an exemplary embodiment of the present disclosure is shown. In this exemplary embodiment, the image has been captured by a rear-view camera in the tow vehicle and a perspective transform, or homography transformation, has been applied to provide a top down perspective. The image depicts the trailer hitch configuration while traveling forward in a straight line. Under these conditions, the centerline of the trailer should align with the centerline of the towing vehicle.

Figure 2C:
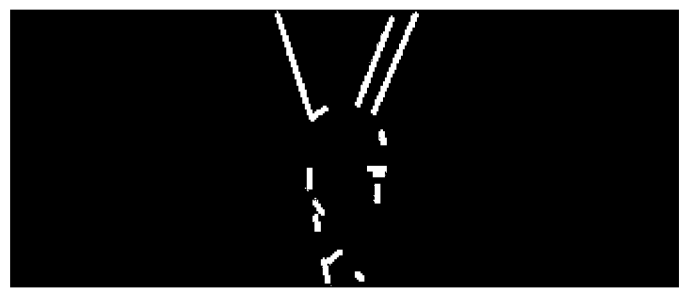
FIG. 2c shows a first exemplary processed image according to an exemplary embodiment of a system for determining a trailer hitch articulation angle in a motor vehicle according to an exemplary embodiment of the present disclosure.

Turning now to FIG. 2c, a first exemplary processed image is shown according to an exemplary embodiment of a system for determining a trailer hitch articulation angle in a motor vehicle according to an exemplary embodiment of the present disclosure is shown. In this exemplary embodiment, the first exemplary processed image is generated in response to image captured by the rear-view camera of the tow vehicle traveling forward in a straight line. The exemplary processed image is indicative of an edge detection image processing technique being performed of the image captured by the rear-view camera of the tow vehicle traveling forward in a straight line. In one exemplary embodiment, the modeling routing may perform an averaging of images over a sequence in straight driving mode in order to generate a sequence of templates at different angles.

Figure 2D:
FIG. 2d shows a second exemplary processed image according to an exemplary embodiment of a system for determining a trailer hitch articulation angle in a motor vehicle according to an exemplary embodiment of the present disclosure.

Turning now to FIG. 2d, a second exemplary processed image is shown according to an exemplary embodiment of a system for determining a trailer hitch articulation angle in a motor vehicle according to an exemplary embodiment of the present disclosure is shown. In this exemplary embodiment, the second exemplary processed image is generated in response to image captured by the rear-view camera of the tow vehicle when the tow vehicle is performing a trailering operation. The exemplary processed image is indicative of an edge detection image processing technique being performed of an image captured by the rear-view camera of the tow vehicle during a trailering operation.

In an exemplary method for determining a HAA the image of FIG. 2c may be compared against the image of FIG. 2d and a change in HAA may be estimated in response to the angular differences of the detected edges in each image. This HAA may then be coupled to a vehicle controller or ADAS responsible for performing the reversing operation. In an exemplary embodiment, the HAA may be estimated by edge matching performed between images by comparison against rotated templates and wherein the HAA is determined by similarity match.

In an additional exemplary embodiment, an initial learning routine may be started to learn an image featured model for each customer's trailer regardless of additions to trailer. Trailer templates of different hitch articulation angles may then be generated by applying view perspective transformation and image rotation. Thus, a template matching step to determine a hitch articulation angle for may be performed for each rear view camera video frame. Soft edge matching scores may then be calculated by comparing the current image edge map with the learned templates.

Figure 3:
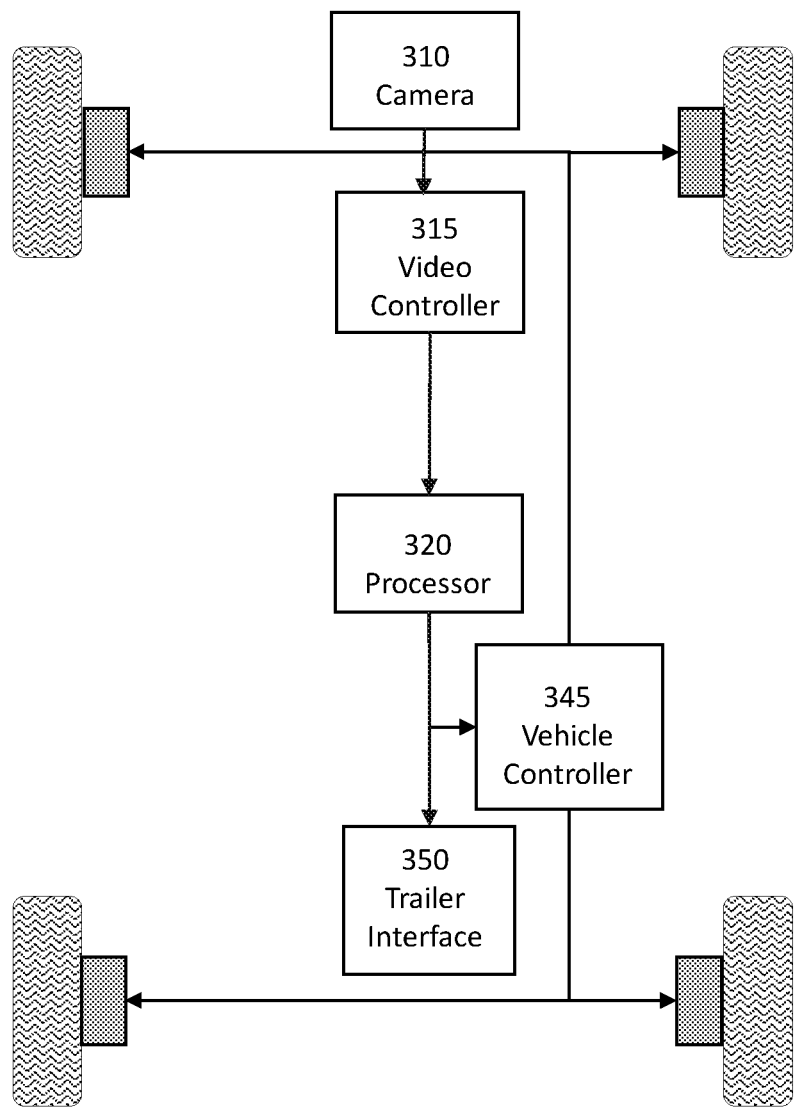
FIG. 3 shows a block diagram of an exemplary system for determining a trailer hitch articulation angle in a motor vehicle according to an exemplary embodiment of the present disclosure.

Turning now to FIG. 3, a block diagram of an exemplary system for determining a trailer hitch articulation angle in a motor vehicle 300 according to an exemplary embodiment of the present disclosure is shown. The system 300 includes a processor 320, a vehicle controller 345, a trailer interface module 350, video controller 315, and a camera 310.

The camera 310 may be a rear-view camera mounted to the rear of the vehicle such that the trailer hitch assembly is visible within the image captured by the camera. Alternatively, or in addition, the camera 310 could be one of a plurality of cameras mounted at separate locations around the vehicle and then aligned together in a panoramic or top down view. The camera 310 may transmit an image or series of images to the processor 320 or to a video controller 315 for processing the images and coupling this signal to the processor 320.

The processor 320 is first operative receive data from the trailer interface module 350, the vehicle controller 345, the camera 310 and/or the video processor 315. In this exemplary embodiment, the processor 320 is operative to monitor the steering position and the longitudinal velocity of the vehicle through the vehicle controller 345. The system is further operative to monitor the trailer interface module 350 to determine if a trailer is being towed. If the trailer is being towed and the vehicle velocity indicates a forward motion, the processor 320 is operative to determine if the vehicle is moving in a straight forward direction thereby resulting in the vehicle centerline and the trailer centerline being aligned. The processor 320 may determine the vehicle is traveling in a straight forward direction is response to steering controller data received via the vehicle controller 345. If the vehicle is moving is moving in a straight forward direction, the rear view camera 310 is then operative to capture one or more images of the trailer hitch assembly. The processor 320 is then operative to receive the one or more images and to perform image detection techniques on the images, such as edge detection or the like, to generate a model of the trailer hitch assembly. These image detection techniques may be performed on a series of images and the cumulative results are used to generate the model of the trailer hitch assembly. Furthermore, the processor 320 may be operative to estimate a trailer centerline with respect to the trailer hitch assembly as part of the model.

The processor 320 is then operative to monitor the data from the vehicle controller 345 and the trailer interface 350 to detect that a trailering operation in a trailering mode will occur. The processor 320 may first receive an indication from the trailer interface 350 that a trailer is detected and then receive an indication from the vehicle controller 345 that the vehicle has been shifted to an operating mode, such as shifting the transmission to a drive or reverse position. The processor 320 is then operative to receive an image from the camera 310, to perform image detection techniques on the image, such as edge detection or the like, to generate a processed image. The processor 320 is then operative to compare the processed image to the model of the trailer hitch assembly to determine an HAA. The HAA may be the angular difference between the model hitch assembly centerline and a detected hitch centerline in the processed image. The processor 320 may then be operative to couple the HAA to the vehicle controller 345 or ADAS controller. The processor 320 may be operative to continuously repeat this processor to generate a series of HAA values for use by the vehicle controller 345 in performing an ADAS trailering function.

The trailer interface module 350 may be operative to generate an indication of an attached trailer. This may be done in response to an impedance measurement on the trailer electrical connector, a deflection measurement on the trailer hitch, or in response to the vehicle being placed into a towing mode.

Figure 4:
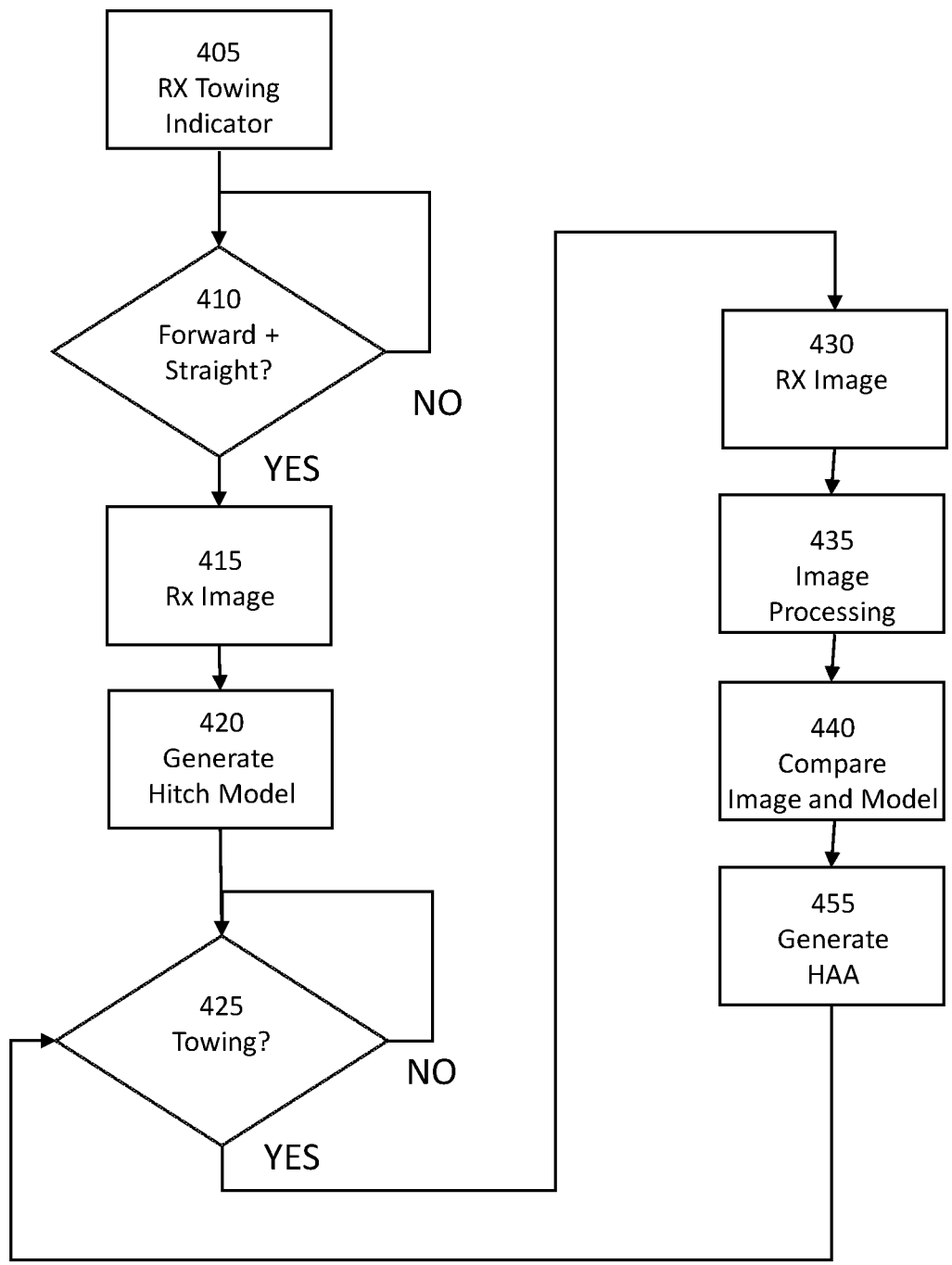
FIG. 4 shows a flow chart illustrating a method for determining a trailer hitch articulation angle in a motor vehicle according to an exemplary embodiment of the present disclosure.

Turning now to FIG. 4, a flow chart illustrating an exemplary method for determining a trailer hitch articulation angle in a motor vehicle 400 according to an exemplary embodiment of the present disclosure is shown. In this exemplary embodiment the method is first operative to receive an indication of a towing operation 405. Examples of this indication may include the towing vehicle being placed into a tow mode via a user interface, an indicator from a trailer interface module indicating the connection of a trailer, or a change in voltage or capacitance on a trailer electrical connector indicating a trailer electrical system has been connected. The user interface may include a button within the vehicle compartment or may be selected through an option on a visual user interface on an infotainment system. The trailer interface module may determine the presence of a trailer in response to an electrical connector being connected or through a deflection of a trailer hitch or in response to a longitudinal force on the trailer hitch.

The method is next operative to determine 410 if the vehicle is traveling in a straight forward direction. The direction of travel may be determined in response to a steering controller determination of steering angle and a vehicle controller indication of vehicle speed and transmission gear selection. Alternatively, the direction and angular velocity of the vehicle may be estimated in response to an inertial measurement unit output. For example, if the vehicle has experienced forward acceleration and no recent lateral acceleration, it may be assumed that the vehicle is traveling in a forward straight line. If it is determined that the vehicle is not traveling in a straight forward direction, the determination is repeated until a straight forward direction condition is detected.

If the vehicle is traveling is a straight forward direction, the method is next operative to receive 415 an image of the trailer hitch assembly. In an exemplary embodiment, the image may be one image in a video feed or video stream from a rear mounted video camera. In response to receiving the image, the method is next operative to generate 420 a model of the trailer hitch assembly. In an exemplary embodiment, the method may be operative to receive an image from a camera and to perform image recognition or image processing techniques to determine a physical model of the trailer hitch assembly. The image processing may include a perspective transformation or edge detection. In one exemplary embodiment, the method may employ Canny edge detection to provide fast edge detection that is invariant to illumination changes. Furthermore, the method may be operative to estimate a trailer centerline as part of the model. The template learning operation for the model may involve averaging over a plurality of images, thresholding, and/or rotation of the image. The method may then be operative to store the model, or trailer templates, in a memory or the like.

After generating the hitch assembly model, the method is operative to determine 425 if a towing operation is occurring. The towing operation may be determined in response to a connection of a trailer with a trailer interface. The towing operation may be determined in response to a velocity measured by a vehicle controller or may be determined in response to a force on the hitch mechanism.

In this exemplary embodiment, once the towing operation has been determined, the method is then operative to receive 430 an image from a rear facing camera. The image may be a single image or a frame of a video stream. The image may be a composite rear-view image generated by combining, or stitching, one or more images from multiple rear facing cameras. In one exemplary embodiment, the composite rear-view image may be a bird's eye image depicting the towing vehicle from above, wherein the composite rear-view image is generated from images from multiple cameras around the towing vehicle. In another exemplary embodiment, a perspective transformation may be performed on the image from the rear facing camera to generate a top down perspective view.

The method is next operative to perform 435 image processing techniques on the received image to generate a processed image. In one exemplary embodiment, the image processing techniques may be edge detection techniques or other image processing techniques, similar to those used to generate the hitch assembly model. The processed image is then compared 440 to the hitch assembly model to determine an angular displacement the hitch assembly elements detected in each image/model. The method is then operative to estimate an HAA in response to the angular displacement.

Figure 5:
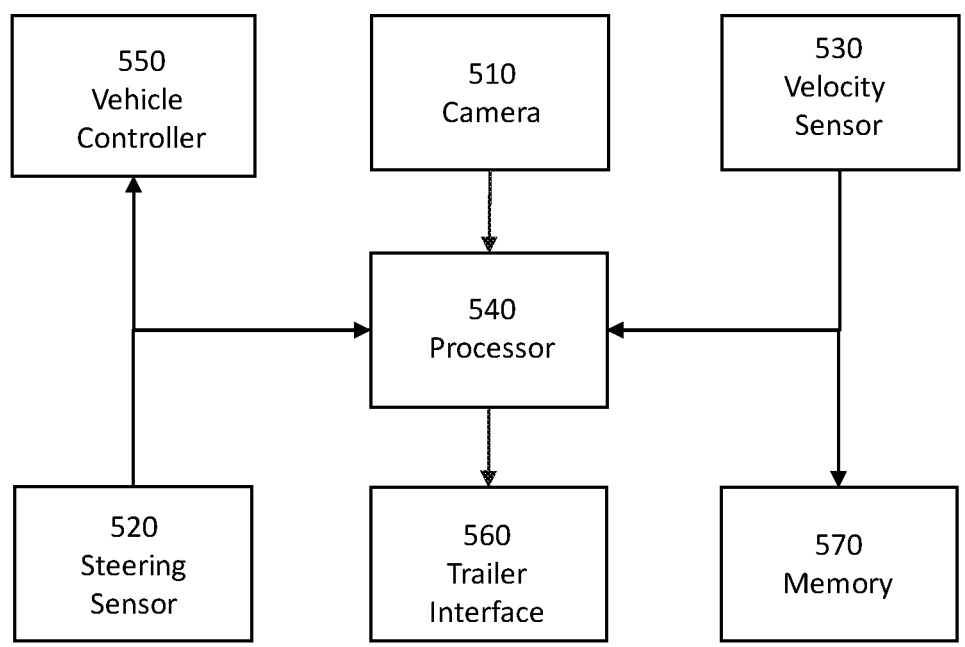
FIG. 5 shows a block diagram illustrating a system for determining a trailer hitch articulation angle in a motor vehicle according to another exemplary embodiment of the present disclosure.

Turning now to FIG. 5, a block diagram illustrating a system 500 for determining a trailer hitch articulation angle in a motor vehicle according to another exemplary embodiment of the present disclosure is shown. The exemplary system includes a camera 510, a steering sensor 520, a velocity sensor 530, a processor 540, a vehicle controller 550, a trailer interface 560, and a memory 570.

The camera 510 may be a wide angle or fisheye lens camera configured to capture one or more images or may be operative to capture a video stream and to couple a plurality of time sequential images to the processor 540 in response to the video stream wherein each image may be a frame of the video stream. Alternatively, the camera 510 may be a Lidar system operative to transmit a light pulse and to receive a reflected light pulse from an object within the Lidar field of view. In one exemplary embodiment, the camera 510 is a rear-view camera positioned on a rear portion of a towing vehicle, such as within a tailgate or the like. In this configuration, the field of view of the camera 510 would be operative to capture a trailer hitch assembly of a trailer attached to the vehicle. In another exemplary embodiment, a perspective transformation may be performed on the image from the rear facing camera to generate a top down perspective view.

The steering sensor 530 may be configured to detect a steering angle. For example, the steering angle may be an angle from which the steering controller differs from a vehicle centerline, such as 0 degrees when the steering controller position matched the vehicle centerline, −5 degrees when the steering controller position is 5 degrees to the left of the vehicle centerline, etc. The steering sensor 530 may be a steering position sensor, steering angle sensor, or the like. In one exemplary embodiment, the steering position sensor estimated the position of the vehicle steering column.

The velocity sensor 530 is operative to detect a vehicle velocity or to provide a vehicle performance characteristic used to estimate a vehicle velocity. For example, the velocity sensor 530 may be a wheel speed sensor, a transmission speed detector, a global positioning system, an inertial measurement unit, or the like. The velocity sensor 530 is operative to couple a data signal representative of the vehicle velocity to the processor 540 for use in ADAS operations or driver information.

The processor 540 is configured to generate a trailer hitch model from a first image in response to the steering angle and the vehicle velocity indicating a vehicle is traveling in a straight forward direction. The trailer hitch model may be generated in response to an edge detection algorithm, such as a Canny edge detection algorithm. In one exemplary embodiment, the trailer hitch model may include a trailer centerline determined in response to the first image and a tow vehicle centerline.

The processor 540 is then further operative to generate a current hitch model from the second image in response to the vehicle velocity indicating the vehicle is traveling in a rearward direction. The processor 540 is then further operative for determining a hitch articulation angle in response to an angular difference between the trailer hitch model and the current hitch model.

The vehicle controller 550 is operative for controlling the vehicle in response to the hitch articulation angle. The vehicle controller 550 may be configured to perform an ADAS algorithm or the like. In one exemplary embodiment, the vehicle controller 550 may be operative to perform a towing operation with the towing vehicle pushing an attached trailer in a rearward direction, such as positioning the trailer in a campsite. The vehicle controller 550 may use the HAA to estimate the trailer centerline and to control the vehicle steering and vehicle throttle in response to the trailer centerline.

The system 500 may further include a trailer interface 560 for generating a trailer connection indicator and wherein the trailer hitch model and the current hitch model are generated in response to the trailer connection indicator being indicative of an attached trailer. The system may further include a memory 570 for storing the trailer hitch model or a plurality of trailer hitch models. The trailer hitch model may be retrieved by the processor 540 in response to a request to determine an HAA.

Figure 6:
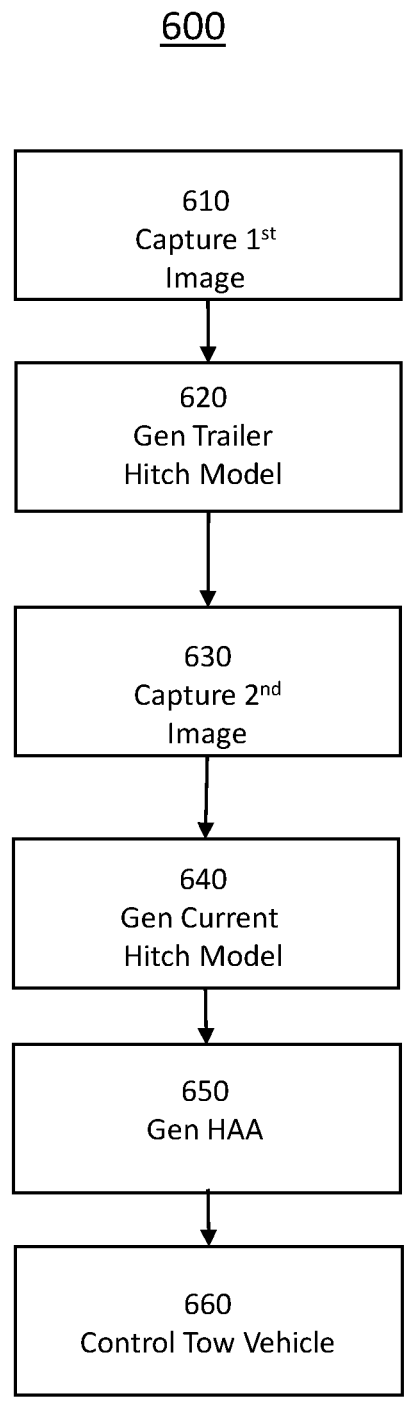
FIG. 6 shows a flow chart illustrating a method for determining a trailer hitch articulation angle in a motor vehicle according to another exemplary embodiment of the present disclosure.

Turning now to FIG. 6, a flow chart illustrating a method 600 for determining a trailer hitch articulation angle in a motor vehicle according to another exemplary embodiment of the present disclosure is shown. The exemplary method 600 is first operative for capturing 610 a first image of a trailer hitch assembly in response to a vehicle traveling in a straight and forward direction. In one exemplary embodiment, the first image may be captured in response to an indication of a trailer connection from a trailer interface or the like. The first image may be captured by a rear-view camera or may be generated by a lidar system. In another exemplary embodiment, a perspective transformation may be performed on the first image to generate a top down perspective view.

The method is next operative for generating 620 a trailer hitch model in response to an image processing technique performed on the first image. The image processing technique may an edge detection operation, such as a Canny edge detection algorithm or alternative image processing or image detection algorithm. In one exemplary embodiment, the image processing technique is operative to detect elements of a trailer hitch assembly of a currently engaged trailer.

The method is next operative for capturing 630 a second image of the trailer hitch assembly in response to the vehicle being operated in a towing operation. In an exemplary embodiment, a perspective transformation may be performed on the second image to generate a top down perspective view of the hitch assembly. The method is next operative for generating 640 a current hitch model in response to the image processing technique performed on the second image.

The method is next operative for determining 650 a hitch articulation angle in response to an angular difference between the trailer hitch model and the current hitch model. The hitch articulation angle may be determined in response to a difference between an angle of a detected trailer hitch component in the trailer hitch model and an angle of a detected trailer hitch component in the current hitch model. For example, the hitch articulation angle may be estimated in response to a trailer hitch assembly centerline determined from the trailer hitch model and a trailer hitch assembly centerline determined from the current hitch model. In another exemplary embodiment, the hitch articulation angle is determined in response to a soft edge matching technique for edge detection.

The method is then operative for controlling 660 the vehicle in response to the hitch articulation angle. The method may be performed by a vehicle controller in response to an indication of a towing operation. In an exemplary embodiment, the controlling of the vehicle may include performing an automated driving assistance algorithm during a towing operation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
    a camera for capturing a first image and a second image;
    a steering sensor configured to detect a steering angle;
    a velocity sensor configured to detect a vehicle velocity;
    a processor configured to for generating a trailer hitch model from the first image in response to the steering angle and the vehicle velocity indicating a vehicle is traveling in a straight forward direction, generating a current hitch model from the second image in response to the vehicle velocity indicating a reverse vehicle motion, determining a hitch articulation angle in response to an angular difference between the trailer hitch model and the current hitch model; and a vehicle controller controlling the vehicle in response to the hitch articulation angle.

2. The apparatus of claim 1 further including a trailer interface for generating a trailer connection indicator and wherein the trailer hitch model and the current hitch model are generated in response to the trailer connection indicator being indicative of an attached trailer.

3. The apparatus of claim 1 wherein the camera is a rear-view camera.

4. The apparatus of claim 1 wherein the trailer hitch model is generated in response to an edge detection algorithm and the first image.

5. The apparatus of claim 1 wherein the trailer hitch model includes a trailer centerline.

6. The apparatus of claim 1 wherein the trailer hitch model is generated in response to a Canny edge detection algorithm and the first image.

7. The apparatus of claim 1 further including a memory for storing the trailer hitch model.

8. The apparatus of claim 1 wherein the vehicle controller is configured to perform a reverse trailering operation in response to the hitch articulation angle.

9. A method comprising:
capturing, by a camera, a first image of a trailer hitch assembly in response to a vehicle traveling in a straight and forward direction;
generating, using a processor, a trailer hitch model in response to an image processing technique performed on the first image;
capturing, by the camera, a second image of the trailer hitch assembly in response to the vehicle traveling in a reverse vehicle direction;
generating, by the processor, a current hitch model in response to the image processing technique performed on the second image;
determining, by the processor, a hitch articulation angle in response to a difference between the trailer hitch model and the current hitch model;
controlling, using a vehicle controller, the vehicle in response to the hitch articulation angle.

10. The method of claim 9 wherein the first image is further captured in response to an indication of a trailer connection.

11. The method of claim 9 wherein the first image and the second image are generated by a lidar system.

12. The method of claim 9 wherein controlling the vehicle includes performing an automated driving assistance algorithm during a towing operation.

13. The method of claim 9 wherein the first image and the second image are captured by a rear-view camera.

14. The method of claim 9 wherein the hitch articulation angle is determined in response to a soft edge matching technique.

15. The method of claim 9 wherein the method is performed by a vehicle controller in response to an indication of a towing operation.

16. The method of claim 9 wherein the first image is captured in response to a trailer detection indicator generated by a trailer interface.

17. An advanced driver assistance system comprising;
an inertial measurement unit for detecting a vehicle acceleration;
a camera for capturing a first image of a trailer hitch assembly and a second image of the trailer hitch assembly;
a processor configured to generate a trailer hitch model in response to the first image and the vehicle acceleration being indicative of a forward vehicle motion, a current hitch model in response to the second image and the vehicle acceleration being indicative of a reverse vehicle motion and to determine a hitch articulation angle in response to a comparison of the current hitch model and the trailer hitch model; and
a vehicle controller configured to perform a reversing operation in response to the hitch articulation angle.

18. The advanced driver assistance system of claim 17 including a trailer interface configured to detect a trailer indicator in response to a connection of a trailer and wherein the trailer hitch model and current hitch model are generated in response to the trailer indicator.

19. The advanced driver assistance system of claim 17 wherein the forward vehicle motion and the reverse vehicle motion are determined in response to a transmission gear selection.

20. The advanced driver assistance system of claim 17 wherein the trailer hitch model further includes a perspective transformation to a top down view of the trailer hitch assembly.

* * * * *